United States Patent
Goleski et al.

(10) Patent No.: US 10,259,308 B2
(45) Date of Patent: Apr. 16, 2019

(54) AXLE ASSEMBLY FOR HYBRID ELECTRIC VEHICLE

(71) Applicant: Ford Global Technologies, LLC, Dearborn, MI (US)

(72) Inventors: Gregory Daniel Goleski, Rochester Hills, MI (US); David Allen Janson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 416 days.

(21) Appl. No.: 15/055,752

(22) Filed: Feb. 29, 2016

(65) Prior Publication Data
US 2017/0246944 A1    Aug. 31, 2017

(51) Int. Cl.
| | |
|---|---|
| B60K 6/36 | (2007.10) |
| B60W 10/08 | (2006.01) |
| B60W 10/11 | (2012.01) |
| B60W 20/00 | (2016.01) |
| B60W 20/10 | (2016.01) |
| F16H 37/08 | (2006.01) |
| F16H 48/08 | (2006.01) |
| B60K 6/48 | (2007.10) |
| F16H 3/78 | (2006.01) |

(52) U.S. Cl.
CPC .................. *B60K 6/36* (2013.01); *B60K 6/48* (2013.01); *B60W 10/08* (2013.01); *B60W 10/11* (2013.01); *B60W 20/00* (2013.01); *B60W 20/10* (2013.01); *F16H 3/78* (2013.01); *F16H 37/0813* (2013.01); *F16H 48/08* (2013.01); *B60K 2006/4808* (2013.01); *B60W 2710/083* (2013.01); *B60W 2710/1005* (2013.01); *B60Y 2200/92* (2013.01); *B60Y 2300/91* (2013.01); *Y02T 10/626* (2013.01); *Y02T 10/6221* (2013.01); *Y10S 903/946* (2013.01)

(58) Field of Classification Search
CPC ......... B60K 6/36; B60W 10/11; B60W 20/00; F16H 37/0826; F16H 48/08; F16H 37/0813
See application file for complete search history.

(56) References Cited

U.S. PATENT DOCUMENTS

| | | | |
|---|---|---|---|
| 6,332,257 B1 * | 12/2001 | Reed, Jr. .................. | B60K 6/26 29/401.1 |
| 6,428,438 B1 * | 8/2002 | Bowen ..................... | B60K 6/36 475/5 |
| 6,827,167 B2 | 12/2004 | Cikanek et al. | |

(Continued)

FOREIGN PATENT DOCUMENTS

| | | | | |
|---|---|---|---|---|
| EP | 3020588 A2 * | 5/2016 | ......... | F16H 37/0806 |
| WO | WO-2017023854 A1 * | 2/2017 | ............... | B60K 6/36 |

*Primary Examiner* — Stacey A Fluhart
(74) *Attorney, Agent, or Firm* — David B. Kelley; Brooks Kushman P.C.

(57) ABSTRACT

A hybrid rear axle provides a variety of functionality in addition to the functionality of a non-hybrid axle. The axle transmits power from an electric motor to the drive wheels at two selectable speed ratios to propel the vehicle. One of the two ratios is usable to propel the vehicle electrically with the engine stopped. With the drive wheels stationary, the axle transmits power from the driveshaft to the motor to charge a battery or from the motor to the driveshaft to start the engine.

20 Claims, 2 Drawing Sheets

(56) References Cited

U.S. PATENT DOCUMENTS

| | | | |
|---|---|---|---|
| 7,121,164 B2* | 10/2006 | Hanyu | B60K 6/387 |
| | | | 74/661 |
| 7,255,187 B2 | 8/2007 | Bell et al. | |
| 7,455,135 B2 | 11/2008 | Janson et al. | |
| 7,462,121 B2 | 12/2008 | Janson et al. | |
| 7,832,514 B2* | 11/2010 | Janson | B60K 6/38 |
| | | | 180/65.265 |
| 8,672,068 B2 | 3/2014 | Janson | |
| 2002/0033059 A1* | 3/2002 | Pels | B60K 6/26 |
| | | | 74/329 |
| 2008/0000312 A1* | 1/2008 | Lang | B60K 6/36 |
| | | | 74/340 |
| 2017/0129323 A1* | 5/2017 | Fremau | B60K 6/442 |

* cited by examiner

AXLE ASSEMBLY FOR HYBRID ELECTRIC VEHICLE

TECHNICAL FIELD

This disclosure relates to the field of hybrid electric vehicles. More particularly, this disclosure is related to a hybrid electric vehicle having a two-speed gearbox.

BACKGROUND

Traditionally, the majority of general purpose road vehicles are powered by liquid fuels such as gasoline or diesel fuel. When the vehicle needs power, an internal combustion engine converts the chemical energy in the fuel into mechanical energy and a powertrain delivers that mechanical energy to vehicle wheels. The vehicles are used over a wide range of vehicle speeds, including both forward and reverse movement. Some types of internal combustion engines, however, are capable of operating efficiently only within a narrow range of speeds. Consequently, the powertrain typically includes a variable speed ratio transmission. Also, a differential assembly may connect the transmission output shaft to the vehicle wheels, providing an additional fixed speed ratio and permitting the left and right wheel to rotate at slightly different speeds as the vehicle turns.

In an effort to reduce the consumption of liquid fuel, some vehicles, called hybrid electric vehicles, utilize electrical energy storage such as a battery. The energy storage capability provides flexibility to perform the conversion of chemical energy when the conversion can be done most efficiently as opposed to always performing the conversion at the moment the power is demanded. Some hybrid electric vehicles, called plug-in hybrid electric vehicles, are also adapted to receive power directly in electrical form.

SUMMARY OF THE DISCLOSURE

An electric axle includes a differential, a layshaft, an electric motor, and first, second and third gears. The differential is configured to transmits power from a carrier to two axles shafts. The layshaft is driveably connected to the carrier. For example, the beveled ring gear may be fixedly coupled to the carrier and a beveled pinion gear may be fixedly coupled to the layshaft and mesh with the ring gear. The electric motor has a rotor shaft. The first gear is selectively coupled to the layshaft. For example, a first sleeve may be supported for rotation with the layshaft and may move axially into engagement with the first gear. The second gear is driveably connected to the first gear and selectively coupled to rotor shaft. A fourth gear may be fixedly coupled to the layshaft and may mesh with the third gear. The third gear is driveably connected to the layshaft and selectively coupled to the rotor shaft. A second sleeve may be supported for rotation with the rotor shaft and may move axially to alternately engage the second gear and the third gear.

The electric axle may also include a controller. The controller is programmed to establish an ICE drive mode by commanding the first sleeve to engage the first gear. While in the ICE drive mode, the controller commands the second sleeve to either engage the second gear to establish a first electric drive ratio or to engage the third gear to establish a second drive ratio. After establishing one of the electric drive ratios, the controller commands the motor to generate torque to either propel the vehicle or charge a battery. The controller may be further programmed to charge the battery using engine power or to start the engine by commanding the first sleeve to disengage the first gear, commanding the second sleeve to engage the second gear, and commanding the motor to generate torque.

DETAILED DESCRIPTION

Figure 1:
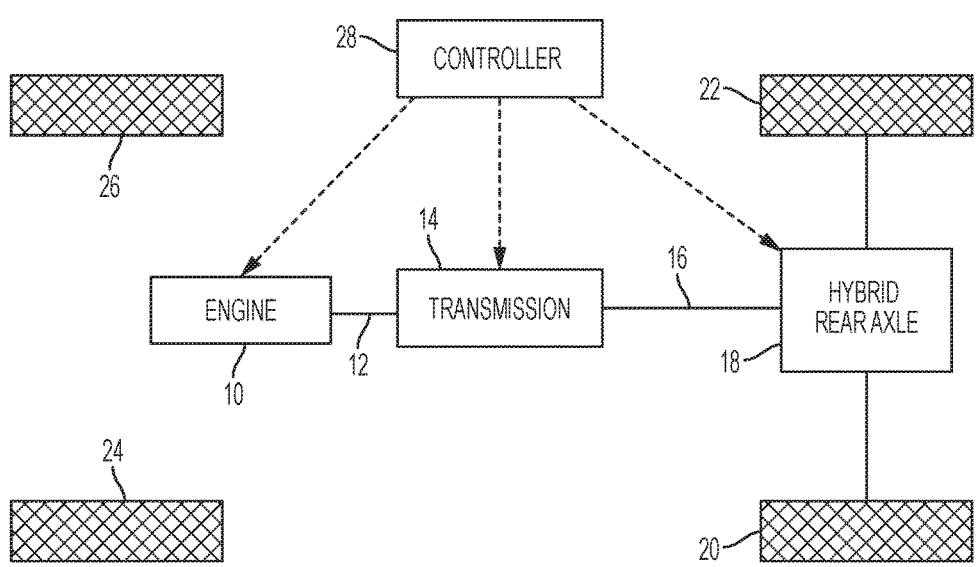
FIG. 1 is a schematic diagram of a hybrid electric vehicle powertrain.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. A component is called a rotating element if it rotates with respect to the transmission housing in at least some operating conditions. Some speed relationships, called fixed speed relationships, are imposed regardless of the state of any shift elements. Other speed relationships, called selective speed relationships, are imposed only when particular shift elements are fully engaged.

A group of elements are fixedly coupled to one another if they are constrained to rotate at the same speed and about the same axis in all operating conditions. Elements may be fixedly coupled by spline connections, welding, press fitting, machining from a common solid, or other means. Slight variations in rotational displacement between fixedly coupled elements can occur such as displacement due to spline lash or shaft compliance. In contrast, two elements are selectively coupled by a shift element when the shift element constrains them to rotate at the same speed about the same axis whenever the clutch is fully engaged and they are free to rotate at distinct speeds in at least some other operating condition. Two rotating elements are coupled if they are either fixedly coupled or selectively coupled. Shift elements include actively controlled devices such as hydraulically or electrically actuated clutches and passive devices such as one way clutches. A shift element may couple rotating elements using friction or may create a positive engagement such as interlocking teeth. A shift element that holds a rotating element against rotation by selectively coupling the rotating element to the housing may be called a brake.

Two rotating elements are drivably connected if a power flow path conveys power from one to the other and constrains the rotational velocities to be proportional in all operating conditions. Drivably connected elements do not necessarily rotate about the same axis as one another. Rotating elements may be drivably connected to one another by shafts, meshing gears, sprockets and chains, various combinations of these, or other means.

FIG. 1 illustrates a hybrid electric vehicle powertrain. An internal combustion engine 10 generates mechanical power to rotate a crankshaft 12 by converting chemical energy. Transmission 14 transmits the mechanical power from crankshaft 12 to driveshaft 16 at a variable speed ratio. The speed ratio is selected such that crankshaft 12 can rotate at a speed at which engine 10 operates efficiently while driveshaft 16 rotates at a speed proportional to vehicle speed. Rear axle 18 divides the power from driveshaft 16 between left and right rear wheels 20 and 22. Rear axle 18 provides approximately equal torque to each rear wheel while allowing some speed difference between the wheels when the vehicle turns a corner. In addition to the functionality traditionally associated with a rear axle, hybrid rear axle 18 provides additional functionality that will be described in detail below. Rear wheels 20 and 22 are called drive wheels because they are used to propel the vehicle. Front wheels 24 and 26 do not propel the vehicle in the configuration illustrated in FIG. 1, but additional components may be provided to divert power to the front wheels in some configurations. Controller 28 sends control signals to engine 10, transmission 14, and hybrid rear axle 18 based on driver inputs such as a shift lever (PRNDL), an accelerator pedal, and a brake pedal.

Figure 2:
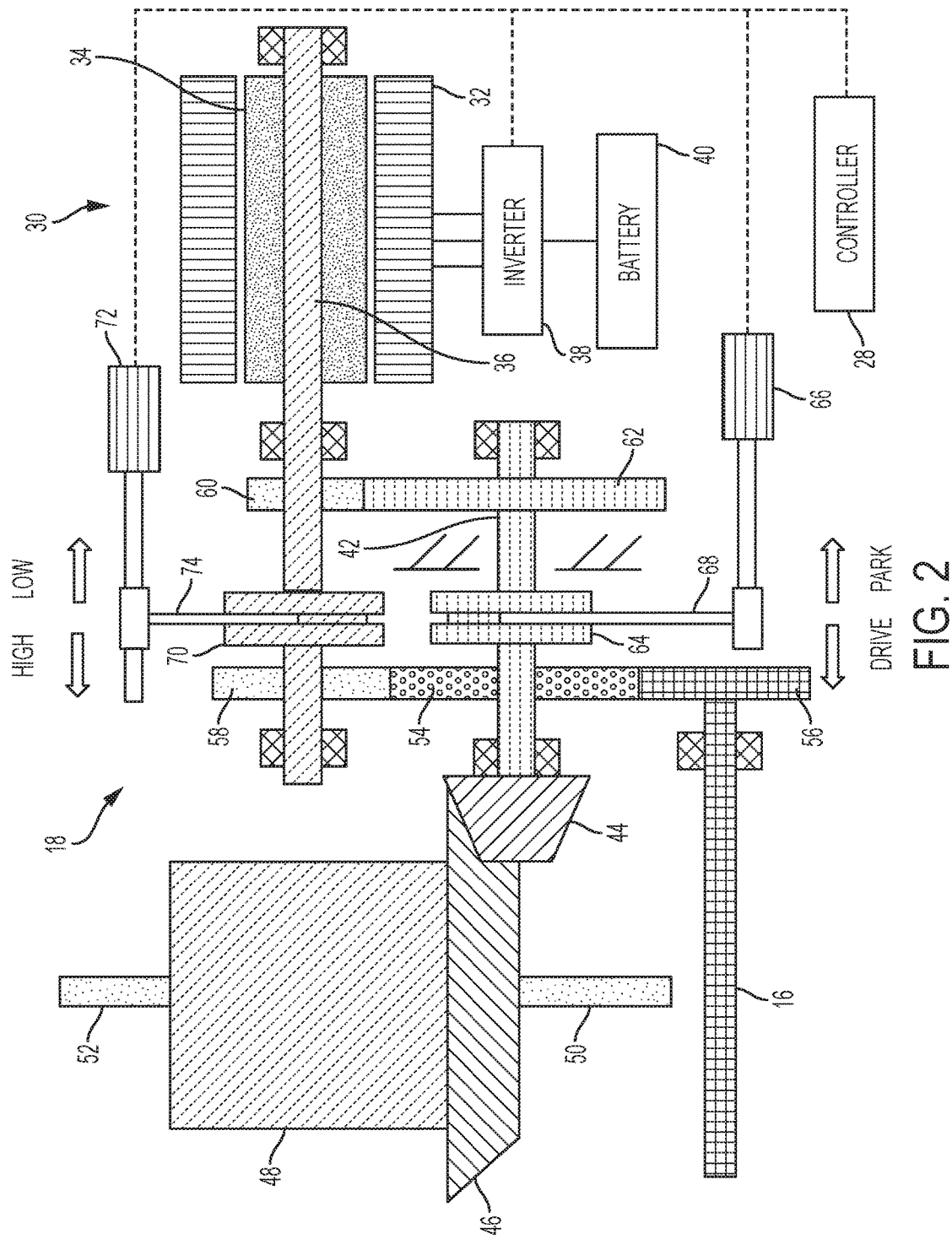
FIG. 2 is a schematic diagram of an electric rear axle suitable for use in the hybrid powertrain of FIG. 1.

FIG. 2 schematically illustrates a two-speed hybrid electric axle 18 utilizing layshaft gearing. Motor 30 includes a stator 32 fixed to the housing and a rotor 34 fixed to a rotor shaft 36 that is supported for rotation by bearings. The motor may be a direct current (DC) motor or an alternating current (AC) motor such as a synchronous permanent magnet motor or an induction motor. The term motor, as used here, includes reversible electric machines that are capable of both converting electrical power into mechanical power and converting mechanical power into electrical power. In the AC motor illustrated in FIG. 1, the torque exerted on shaft 36 by rotor 34 is related to electrical currents flowing through windings of stator 32. During motoring operation, inverter 38 draws direct current electrical power from a battery 40 and supplies three phases of alternating current to windings of stator 32. Controller 28 sends signals to inverter 38 directing inverter 38 to regulate the voltage, frequency, and phase in each winding such that a desired torque is exerted by rotor 34. During generating operation, controller 28 directs inverter 38 to control the voltage, frequency, and phase such that torque is exerted opposite the direction of rotation. Electrical power thereby produced is converted to direct current and stored in battery 40.

Layshaft 42 is supported for rotation by bearings. Beveled pinion gear 44 is fixedly coupled to layshaft 42 and meshes with beveled ring gear 46 which is fixedly coupled to differential carrier 48. The axis of rotation of layshaft 42 and carrier 48 are approximately perpendicular. These axes may also be offset in which case pinion 44 and ring gear 46 would have hypoid gear geometry. Beveled planet gears (not shown) rotate with respect to differential carrier and mesh with beveled side gears (not shown) fixedly coupled to left and right axle shafts 50 and 52. Consequently, although the speeds of the left and right axle shafts may differ from one another, the average speed of the axle shafts is proportional to the speed of layshaft 42 based on the relative numbers of teeth on pinion 44 and ring gear 46. Left axle shaft 50 is fixedly coupled to left rear drive wheel 20 and right axle shaft 52 is fixedly coupled to right rear drive wheel 22. Therefore, layshaft 42 is drivably connected to the drive wheels 20 and 22.

A first gear 54 is supported for rotation about layshaft 42 and meshes with gear 56 which is fixedly coupled to driveshaft 16. A second gear 58 is supported for rotation about rotor shaft 36 and meshes with first gear 54. Third gear 60 is supported for rotation about rotor shaft 36 and meshes with fourth gear 62 which is fixedly coupled to layshaft 42. Third gear 60 has a smaller pitch diameter than second gear 58.

A first sleeve 64 is supported for rotation with layshaft 42. Controller 28 issues commands to actuator 66 to translate fork 68 causing sleeve 64 to slide axially. When sleeve 64 slides to the left (drive), dog teeth engage first gear 54 to selectively couple first gear 54 to layshaft 42. Engaging this drive clutch establishes a power flow path between driveshaft 16 and the drive wheels. When sleeve 64 slides to the right (park), dog teeth engage the housing to selectively hold layshaft 42 against rotation. Engaging this brake prevents vehicle movement. Positioning sleeve 64 is a central position disengages layshaft 42 from both first gear 54 and the housing.

A second sleeve 70 is supported for rotation with rotor shaft 36. Controller 28 issues commands to actuator 72 to translate fork 74 causing sleeve 70 to slide axially. When sleeve 70 slides to the left (high), dog teeth engage second gear 58 to selectively couple second gear 58 to rotor shaft 36. Engaging this high clutch establishes a power flow path between driveshaft 16 and rotor 34. If the drive clutch is also engaged, as described above, a power flow path is also established between rotor 34 and the drive wheels. When sleeve 70 slides to the right (low), dog teeth engage third gear 60 to selectively couple third gear 60 to rotor shaft 36. Engaging this low clutch establishes a power flow path between rotor 34 and the drive wheels, whether or not the drive clutch is also engaged. If the drive clutch is also engaged, a power flow path is also established between rotor 34 and the drive shaft 16. Due to the smaller pitch diameter of third gear 60 relative to second gear 58, rotor 34 rotates faster when the low clutch is engaged than when the high clutch is engaged for given speeds of the drive wheels and driveshaft 16. Positioning sleeve 70 in a central position disengages rotor shaft 36 from both second gear 58 and third gear 60.

The hybrid rear axle of FIG. 2 enables the powertrain of FIG. 1 to operate in a variety of different operating modes to improve overall fuel efficiency. First, the vehicle can operate in an Internal Combustion Engine (ICE) only mode. In this mode, sleeve 64 engages the drive clutch. Sleeve 70 may be placed in the neutral position such that neither the low clutch nor the high clutch are engaged. In this mode, the engine and transmission are operated to satisfy the present driver demanded torque. Any demand for braking force is satisfied using friction brakes on each of the wheels. No energy is stored in or withdrawn from battery 40.

While in ICE mode, sleeve 70 may be used to engage the high clutch to establish a first electric drive ratio between the motor and the wheels. Once the high clutch is engaged, the controller may command the inverter such that the motor exerts a desired amount of torque. The controller may satisfy a portion of the driver demand using the engine and transmission while satisfying the remainder using the motor. Doing so reduces immediate fuel consumption while withdrawing electrical energy from battery 40. At other times, the controller may command the engine and transmission to produce more power than the present driver demand and command the motor to exert torque in an opposite direction to absorb the excess power. This increases immediate fuel consumption but stores electrical energy in battery 40. Use of this charging operation may improve overall fuel economy because the stored electrical energy may be used in a future operating condition to reduce immediate fuel consumption by more than immediate fuel consumption is increased in this charging operation.

If the driver demands braking while the ICE mode is selected with high clutch engaged, the motor may be commanded to provide the demanded negative torque. The controller would reduce the friction braking torque by a corresponding amount such that the total braking force matches the driver demand. Vehicle kinetic energy is converted into electrical energy which is stored in the battery. This energy may be used later to reduce fuel consumption. The engine is commanded to not generate power during the braking maneuver.

At low vehicle speed, sleeve 70 may be moved in the opposite direction to engage the low clutch. While in ICE mode, the same options are available for utilizing the electric motor. Specifically, the motor may provide additional torque, charge the battery from excess engine power, or charge the battery during braking. However, the motor rotates faster for any given vehicle speed, enabling the motor to operate more effectively. When engaging either the high clutch or the low clutch, the motor may be placed in a speed control mode to match the speed of rotor shaft 36 to gear 58 or gear 60 respectively.

An electric only driving mode is established by placing sleeve 64 in the neutral position and using sleeve 70 to engage the low clutch. In this condition, no power flow path exists between driveshaft 16 and the wheels or the motor. The engine may be stopped to reduce fuel usage to zero. A power flow path is established between rotor 34 and the drive wheels. The controller commands the electric motor to satisfy driver power demands using battery power. When the driver demands braking, the controller satisfies the request with a combination of electric motor torque and friction braking.

If the battery becomes depleted in electric driving mode or if the motor is incapable of satisfying the demand by itself, it is desirable to start the engine. If the vehicle is moving this may be accomplished using electric motor 30. First, the transmission is placed in neutral. Then, sleeve 64 is moved to engage the drive clutch. In order to overcome the inertia of the driveline and other components, the drive clutch may include a friction surface similar to a manual transmission synchronizer. Once the drive clutch is engaged, a transmission clutch may be gradually engaged to bring the engine up to speed. The controller may request additional torque from motor 30 during this process in order to continue delivering the demanded power to the drive wheels. Once the engine is up to speed, the controller begins delivering fuel and spark to start the combustion process.

If the vehicle is stationary, a different method of starting the engine is required. To start the vehicle when the vehicle is stationary, the drive clutch is disengaged and the high clutch is engaged. This establishes a power flow path between rotor 34 and driveshaft 16. With the transmission engaged in a gear, a power flow path is established between rotor 34 and the engine. The controller commands electric motor 30 to generate torque to bring the engine up to idle speed. Since the drive clutch is disengaged, no torque is transmitted to vehicle wheels and the speed of the vehicle is unconstrained.

Once the engine is running with the drive clutch disengaged and the high clutch engaged, power from the engine may be used to charge the battery via motor 30. This permits charging while the vehicle is in park. However, a parking pawl within the transmission is not able to hold the vehicle stationary in this mode. To hold the vehicle stationary in this mode, sleeve 64 is moved to the park position to hold layshaft 42 and the vehicle wheels stationary.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric axle comprising:
    a differential configured to transmit power from a carrier to two axle shafts;
    a layshaft driveably connected to the carrier;
    a first gear selectively coupled to the layshaft;
    an electric motor having a rotor shaft;
    a second gear driveably connected to the first gear and selectively coupled to the rotor shaft; and
    a third gear driveably connected to the layshaft and selectively coupled to the rotor shaft.

2. The electric axle of claim 1 further comprising:
    a beveled ring gear fixedly coupled to the carrier; and
    a beveled pinion gear fixedly coupled to the layshaft and in continuous meshing engagement with the beveled ring gear to drivably connect the layshaft to the carrier.

3. The electric axle of claim 1 further comprising a first sleeve supported for rotation with the layshaft and configured to move axially into engagement with the first gear to selectively couple the first gear to the layshaft.

4. The electric axle of claim 1 further comprising a fourth gear fixedly coupled to the layshaft and in continuous meshing engagement with the third gear to driveably connect the third gear to the layshaft.

5. The electric axle of claim 1 further comprising a second sleeve supported for rotation with the rotor shaft and configured to move axially to alternately engage the second gear and the third gear to selectively couple the second and third gears to the rotor shaft.

6. An hybrid electric drive comprising:
    a layshaft adapted to be driveably connected to drive wheels;
    a first gear selectively coupled to the layshaft and adapted to be driveably connected to a transmission output;
    an electric motor having a rotor shaft;
    a second gear driveably connected to the first gear and selectively coupled to the rotor shaft; and
    a third gear driveably connected to the layshaft and selectively coupled to the rotor shaft.

7. The hybrid electric drive of claim 6 wherein the layshaft is adapted to be driveably connected to drive wheels via a beveled pinion gear fixedly coupled to the layshaft and configured to mesh with a beveled ring gear of a differential.

8. The hybrid electric drive of claim 6 further comprising a fourth gear fixedly coupled to the layshaft and in continuous meshing engagement with the third gear to driveably connect the third gear to the layshaft.

9. The hybrid electric drive of claim 6 further comprising a first sleeve supported for rotation with the layshaft and configured to move axially into engagement with the first gear to selectively couple the first gear to the layshaft.

10. The hybrid electric drive of claim 9 further comprising a second sleeve supported for rotation with the rotor shaft and configured to move axially to alternately engage the second gear and the third gear to selectively couple the second and third gears to the rotor shaft.

11. The hybrid electric drive of claim 10 further comprising a controller programmed to
establish an ICE drive mode by commanding the first sleeve to engage the first gear;
in the ICE drive mode, command the second sleeve to either engage the second gear to establish a first electric drive ratio or to engage the third gear to establish a second electric drive ratio; and
after establishing either the first electric drive ratio or the second electric drive ratio, command the motor to generate torque to either propel drive wheels or charge a battery.

12. The hybrid electric drive of claim 11 wherein the controller is further programmed to establish an electric drive mode by commanding the first sleeve to disengage the first gear and commanding the second sleeve to engage the third gear.

13. The hybrid electric drive of claim 11 wherein the controller is further programmed to charge the battery by commanding the first sleeve to disengage the first gear, commanding the second sleeve to engage the second gear, and commanding the motor to generate torque.

14. The hybrid electric drive of claim 11 wherein the controller is further programmed to start an engine by commanding the first sleeve to disengage the first gear, commanding the second sleeve to engage the second gear, and commanding the motor to generate torque.

15. A hybrid electric vehicle comprising:
an engine;
four wheels including two drive wheels;
a multi-speed transmission having an input driven by the engine and an output fixedly coupled to a driveshaft; and
a hybrid axle having an electric motor and configured to
transmit power from the driveshaft to the two drive wheels to propel the vehicle,
transmit power from the motor to the two drive wheels at two selectable ratios of motor speed to wheel speed to propel the vehicle,
transmit power from the driveshaft to the motor with the four wheels stationary to charge a battery, and
transmit power from the motor to the engine via the driveshaft and transmission with the four wheels stationary to start the engine.

16. The hybrid electric vehicle of claim 15 wherein the hybrid axle further comprises:
a differential configured to transmit power from a carrier to the two drive wheels;
a layshaft driveably connected to the carrier;
a first gear selectively coupled to the layshaft and driveably connected to the driveshaft;
a second gear driveably connected to the first gear and selectively coupled to the electric motor; and
a third gear driveably connected to the layshaft and selectively coupled to electric motor.

17. The hybrid electric vehicle of claim 16 further comprising:
a beveled ring gear fixedly coupled to the carrier; and
a beveled pinion gear fixedly coupled to the layshaft and in continuous meshing engagement with the beveled ring gear to drivably connect the layshaft to the carrier.

18. The hybrid electric vehicle of claim 16 further comprising a first sleeve supported for rotation with the layshaft and configured to move axially into engagement with the first gear to selectively couple the first gear to the layshaft.

19. The hybrid electric vehicle of claim 16 further comprising a fourth gear fixedly coupled to the layshaft and in continuous meshing engagement with the third gear to driveably connect the third gear to the layshaft.

20. The hybrid electric vehicle of claim 16 further comprising:
a rotor shaft drivably connected to a rotor of the electric motor; and
a second sleeve supported for rotation with the rotor shaft and configured to move axially to alternately engage the second gear and the third gear to selectively couple the second and third gears to the rotor shaft.

* * * * *